United States Patent [19]

Zimmermann

[11] 4,105,380
[45] Aug. 8, 1978

[54] COOLING APPARATUS FOR AIR COOLING TUBULAR PLASTICS FILM MADE BY A FILM BLOWHEAD

[75] Inventor: Werner Josef Zimmermann, Lengerich of Westphalia, Fed. Rep. of Germany

[73] Assignee: Windmoller & Holscher, Lengerich of Westphalia, Fed. Rep. of Germany

[21] Appl. No.: 777,051

[22] Filed: Mar. 14, 1977

[30] Foreign Application Priority Data

Mar. 15, 1976 [DE] Fed. Rep. of Germany ....... 2610818

[51] Int. Cl.² .............................................. B29F 3/00
[52] U.S. Cl. ............................... 425/72 R; 425/326.1; 425/404; 425/445
[58] Field of Search ............... 264/95, 209; 425/72 R, 425/326 R, 445, 387 R, 446, 404, 326.1, 387.1

[56] References Cited

U.S. PATENT DOCUMENTS 3,762,853  10/1973  Upmeier ........................... 425/326 R
3,898,028  8/1975  Upmeier ........................... 425/326 R

*Primary Examiner*—Francis S. Husar
*Assistant Examiner*—Mark Rosenbaum
*Attorney, Agent, or Firm*—Fleit & Jacobson

[57] ABSTRACT

Cooling apparatus for tubular plastics film made by a film blowhead has provision for air cooling and for replacement of the internal cooling air through a central aperture in the blowhead. The cooling apparatus comprises superposed cooling air supply rings having outlet apertures facing the inside of the film and apertures extending axially through the air supply rings for the passage of the cooling air from the lower into the higher air supply rings and radial apertures for withdrawing the cooling air that is blown out of the outlet apertures between the air supply rings. The air supply rings consist of superposed cylindrical rings interconnected by tubular webs that pass through the rings and form radial apertures, the rings being supported on one another at least by their inner ring portions and bounding an annular passage between each other.

9 Claims, 2 Drawing Figures

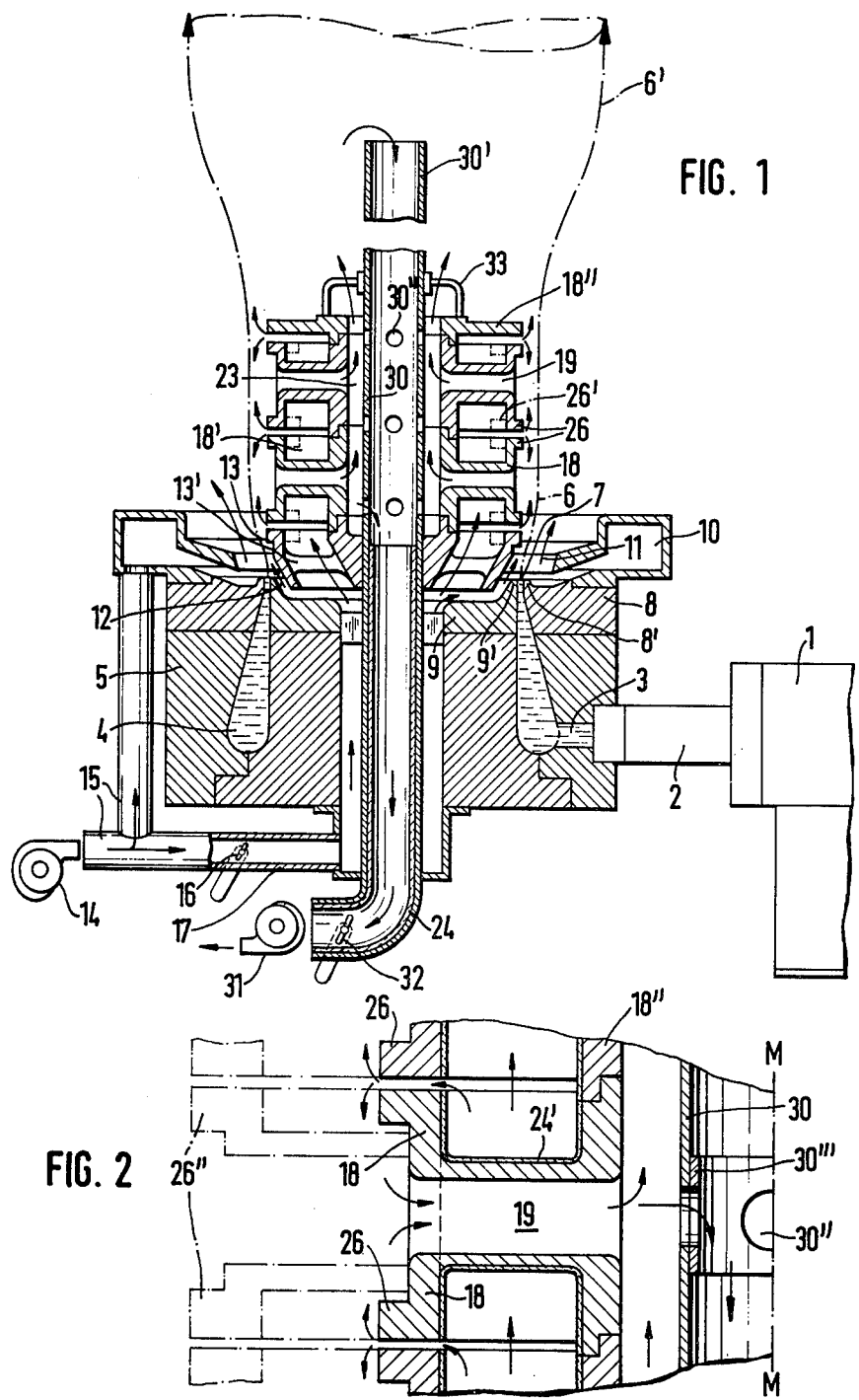

COOLING APPARATUS FOR AIR COOLING TUBULAR PLASTICS FILM MADE BY A FILM BLOWHEAD

This invention relates to an improvement in or modification of the subject matter disclosed in German Patent Application P 22 62 190.5-16, which corresponds to
US Pat. No. 3,898,028 filed Dec. 13th, 1973
UK Application 58495/73 filed Dec. 18th, 1973
Japanese Application 142963/1973 filed Dec. 19th, 1973
Canadian Application 188493 filed Dec. 19th, 1973.

The invention relates to a cooling apparatus for tubular plastics film made by a film blowhead, wherein provision is made for air cooling and replacement of the internal cooling air through a central aperture in the blowhead, comprising superposed cooling air supply rings having gap-like outlet apertures facing the inside of the film and apertures extending axially through the air supply rings for the passage of the cooling air from the lower into the higher air supply rings and radial apertures for withdrawing the cooling air blown out of the outlet apertures between the air supply rings, according to U.S. Pat. No. 3,898,028.

In film blowing installations having advantageous cooling of the tubular film by means of air, the high possible output capacities have become attainable only by means of installations equipped with internal air cooling apparatus in which provision is made for air replacement through a central aperture of the blowhead. The internal cooling apparatus for the tubular film in accordance with the referenced patent has proved particularly efficient, wherein the cooling air blown out of the gap-like outlet apertures of the air supply rings cools the tubular film and supports it with the aid of the air cushion formed by the stream of blown air.

In the internal cooling air apparatus described in the referenced patent, the increased efficiency is obtained by the repeated supply of fresh cooling air through the superposed internal cooling rings between which the heated cooling air is withdrawn radially inwardly. The supply of the cooling air to the internal cooling rings takes place through an annular passage extending through the blowhead and coaxially surrounding the air outlet tube. From this annular passage, the cooling air is led by way of connecting tubes that are parallel to one another and to the longitudinal axis of the blowhead into the individual spaced cooling rings between which the heated cooling air enters the annual passage formed between the cooling rings and the central air outlet pipe and is then withdrawn.

In the apparatus according to the referenced patent, the anchoring of the individual air supply rings at a spacing from one another and their interconnection by means of conduits is expensive. Further, the individual air supply rings as well as the conduits interconnecting same are swept by the heated outflowing air so that the supplied cooling air is undesirably heated. Thermal insulation can be provided on the cooling rings of the referenced patent only with difficulties.

It is therefore a problem of the present invention to improve the cooling apparatus of the referenced patent so that it has a still better cooling effect and can be made more simply and cheaply.

According to the invention, this problem is solved in a cooling apparatus according to the referenced patent in that the cooling air supply rings consist of concentric superposed cylindrical rings interconnected by tubular webs that pass through the rings and form radial apertures, the rings being supported on one another at least by their inner rings and bounding an annular passage between each other. The cooling apparatus according to the invention can be built up simply by plugging together identical rings of which a desired number can be superposed. The individual cooling rings can be economically manufactured as castings which can subsequently be simply machined on a lathe or a boring machine.

The gap-like outlet apertures may be formed by the rims of the outer rings that are spaced from each other by the height of the gap. The outer ring is held by the tubular webs which connect same to the inner ring. The tubular webs may interconnect the inner and outer rings by means of a spoke-like arrangement. The heated air leaving the gap-like outlet apertures is passed through the tubular webs into the annular passage formed between the internal cooling air supply rings and the air outlet tube and is led away, it being possible for the suction tube for the exhausted air to be provided in the region of the internal cooling rings with radial bores to prevent the accumulation of internal cooling air when large quantities of cooling air are being conveyed. The annular passage is not closed from the film bubble so that the pressure within the annular passage substantially corresponds to the bubble pressure within the film bubble.

In a further development of the invention, the cooling ring lips bounding the outlet apertures may be in the form of rings that can be placed over the rims of the outer rings. Since a film blowhead of a particular nominal size can conventionally be provided with different diameters for the annular gap to which the outer diameters of the internal cooling air rings must substantially correspond, it is in this way possible to form the region of the actual cooling ring lips as a plug construction whilst maintaining the relatively complicated construction of the internal portion with the tubular webs. The expensive production is further reduced in comparison with the construction of the referenced patent by this simple possibility of modifying the casting.

In the cooling apparatus according to the invention, the inner sides of the cooling rings are readily accessible so that they can be provided in a simple manner with effective thermal insulation from the heat of the withdrawn air.

Other advantageous embodiments of the invention are described in more detail in the subsidiary claims.

An example of the invention will now be described in more detail with reference to the drawing in which:

FIG. 1 is a diagrammatic longitudinal section through a film blowhead with internal cooling apparatus, and FIG. 2 is an enlarged part-section through individual cooling air supply rings according to FIG. 1 with plug-in cooling ring lips indicated in broken lines.

From the diagrammatically indicated extruder 1, the molten material is led through the connection 2 and the passage 3 to the distributing passage 4 of the blowhead 5 illustrated in simplified form. The tubular film 6 is shaped by means of the nozzle gap 7 formed by the nozzle rings 8, 9, the nozzle lips 8', 9' projecting in the form of annular beads to improve cooling of this portion. The distended and cooled tubular film 6' is, as usual, flattened, taken off and fed to a coiler (not shown).

On the outside of the tubular film, the nozzle lip 8' and the tubular film are cooled by the cooling ring 10 with the aid of the stream 11 of cooling air. The cooling air for the outer cooling ring or the internal cooling apparatus for the tubular film is conveyed by the diagrammatically indicated fan 14 and is fed by means of the branch tube 15 to the cooling ring 10 or by means of the tube 17 to the internal cooling apparatus. A throttle flap 16 controls the quantity of the conveyed internal cooling air and thus the degree of inflation.

The internal cooling air is led by way of the hub 13 into the annular passage 18' formed by the outer wall or inner wall and is passed through the inside 6 of the film by the cooling ring lips 26. This annular passage 18' extending from one internal cooling ring to the other thereby effectively evens out the air distribution. In a further embodiment, the cooling ring lips 26 can extend as inner lips 26' right into the distributing pasage 18' for the purpose of evening out the cooling air distribution. The heated cooling air is then passed through the tubular webs 19 into the annular passage 23 from which it enters the tubular bubble. To increase the suction effect and thereby the cooling efficiency, it is advantageous to provide the air outlet tube 30 in known manner with the through holes 30" in the region of the internal cooling rings, so that part of the heated cooling air can enter the air outlet tube directly and only the remaining quantity of air has to be led off by way of the suction tube 30' that extends into the flattening zone. This remaining quantity of air flushes out the film bubble to remove vaporised components and thereby ensure that the inside of the film is dry.

By means of an adjustable throttle ring 30''', the air holes 30" in the air outlet tube 30 can be partially closable. This makes it possible to vary within wide limits the ratio of the quantity of air withdrawn directly to that sucked out of the film bubble.

The heated cooling air is withdrawn from the tube 30 by means of the diagrammatically indicated fan 31 with the throttle flap 32. The throttle flap 32 enables the total quantity of internal cooling air to be determined whilst the throttle flap 16 in the air supply controls the extent of inflation.

Cooling of the projecting annular bead 9' of the internal nozzle ring is effected by the stream 12 of cooling air which is moved past between the adapted lowermost cooling ring 13 and the nozzle ring 9.

The air outlet tube 30 is desirably provided with thermal insulation 24 in the region of the film blowhead 5, 9 and the internal faces of the internal cooling rings 18 are provided with the thermal insulation 24'.

The uppermost internal cooling ring sealing cover 18" is connected to the air outlet tube 30 by the webs 33. Similarly, it is possible to connect the individual cooling ring parts 18 to the lowermost internal cooling ring 13 by means of tension anchors (not shown). The lowermost internal cooling ring 13 is, together with the hub portion, held on the suction tube 30 by way of webs 13'.

FIG. 2 shows how the internal cooling ring 18 is equipped with the cooling ring lip 26 for the smallest nominal diameter of the film blowhead and how, by means of a plug connection, the cooling ring lips 26" can be modified for the largest nominal width. The relatively complicated casting with the internal hub 18" and the tubular webs 19, of which there are preferably several distributed around the periphery of the cooling ring, need not be changed for this purpose.

I claim:

1. Cooling apparatus for tubular plastics film made by a film blowhead, wherein provision is made for air cooling the tubular plastics film and removal of internal cooling air through a central aperture in the blowhead, the apparatus comprising cooling air supply rings for supporting the film on such inside and having gaplike outlet passageways facing such inside of the film for directing cooling air onto such film and axial pasageways extending axially through the air supply rings for the passage of the cooling air from the lower into the higher air supply rings and radial passageways for withdrawing the cooling air directed onto the film by such outlet passageways between the air supply rings, wherein the improvement comprises the cooling air supply rings being formed of concentric inner and outer cylindrical rings interconnected by tubular webs that define the radial passageways, the radial passageways extending between openings formed in the inner and outer rings, the air supply rings being superposed and supported on one another at least by their inner rings with their inner and outer rings bounding the axial passageways therebetween.

2. Cooling apparatus according to claim 1, characterised in that the gap-like outlet passageways are formed by the outer rings being spaced from each other by the height of the gap.

3. Cooling apparatus according to claim 1, characterised in that the outer rings include cooling ring lips bounding the outlet passageways.

4. Cooling apparatus according to claim 1, characterised in that the cooling air supply rings are in the form of castings.

5. Cooling apparatus according to claim 1, characterised in that the inner rings of the air supply rings include grooved webs for positively intergaging two inner rings with each other.

6. Cooling apparatus according to claim 1, characterised in that a central tube for removing internal cooling air is axially aligned with said cooling air rings and is capable of projecting into such a tubing being made and thermal insulation is provided on said central tube to the cooling air supply rings.

7. Cooling apparatus according to claim 1, characterised in that the internal faces of the air supply rings are provided with thermal insulation.

8. Cooling apparatus according to claim 2 further including ring means operatively associated with said outer rings to be detachably connected to the outer rings thereby defining second outlet passageways radially spaced from the outlet passageways formed by the outer rings.

9. An apparatus for cooling plastics material tubing comprising a blowhead of the type having defined therein a central air passageway for introduction and removal of internal cooling air, a central tube axially aligned within said central passageway and projecting into such tubing being made for removing internal cooling air, an annular die orifice surrounding said central tube, and at least two axially spaced superposed guide rings for supporting tubing being made on the inside, the guide rings radially surrounding said central tube, wherein the improvement comprises the guide rings being formed of concentric inner and outer cylindrical rings interconnected by tubular webs that define radial passageways extending between openings formed in the inner and outer rings, the axial length of the inner ring being greater than the axial length of the outer ring so that when adjacent cylindrical rings are superposed on each other, their inner rings are interconnected with each other, a first annular passage being defined between the interconnected inner rings and the central tube, said first annular passage connecting said radial passageways to said central tube, outlet passageways being defined between the outer rings for directing cooling air onto the film, and a second annular passage being defined between the inner and outer rings for directing cooling air from the central air passageway to said outlet passageways.

* * * * *